United States Patent [19]

Marsh

[11] Patent Number: 4,508,325

[45] Date of Patent: Apr. 2, 1985

[54] COMPOSITE LEAF SPRINGS

[75] Inventor: Barry J. Marsh, Penkridge, England

[73] Assignee: GKN Technology Limited, England

[21] Appl. No.: 481,807

[22] Filed: Apr. 4, 1983

[30] Foreign Application Priority Data

Apr. 21, 1982 [GB] United Kingdom ............... 8211553
Sep. 14, 1982 [GB] United Kingdom ............... 8226139

[51] Int. Cl.³ .............................................. F16F 1/26
[52] U.S. Cl. ...................................... 267/47; 267/149
[58] Field of Search ................... 267/47, 48, 49, 148, 267/149

[56] References Cited

U.S. PATENT DOCUMENTS

| | | | |
|---|---|---|---|
| 2,161,838 | 6/1939 | Thompson | 267/47 |
| 2,253,255 | 8/1941 | Weber | 267/47 X |
| 2,299,873 | 10/1942 | Beckel et al. | 267/47 |
| 3,586,307 | 6/1971 | Brownyer | 267/47 |

FOREIGN PATENT DOCUMENTS 141944 11/1979 Japan .................. 267/149

Primary Examiner—Duane A. Reger
Attorney, Agent, or Firm—Marshall, O'Toole, Gerstein, Murray & Bicknell

[57] ABSTRACT

An assembly of a leaf spring of composite, fibre reinforced resin, material, and a component secured to the spring by clamping means, wherein the relative positions of the spring and component are determined by a locating element with a head engaging in a shallow, sloping walled, recess in the spring, and a body which engages the component, e.g. with an aperture therein. An element of resilient material, e.g. a polyurethane rubber, may be positioned adjacent the spring surface to prevent abrasive wear thereof.

13 Claims, 5 Drawing Figures

COMPOSITE LEAF SPRINGS

BACKGROUND TO THE INVENTION

1. Field of the Invention

This invention relates to leaf springs made of a composite, fibre reinforced resin, material. More particularly, the invention relates to the provision of means by which another member or component can accurately be located relative to a spring.

For example, in automotive applications a leaf spring will usually require an axle to be secured to it at or near its centre. Such securing will normally be carried out by a clamp arrangement embracing the spring, but this does not provide location of the axle longitudinally of the spring. This has been done by a hole drilled through the spring to receive a bolt or the like, but unless the disposition of such a hole is carefully chosen it can affect the properties of the spring. In any event, it is inconvenient to have to drill a hole through the spring in an additional manufacturing operation. A further situation where some form of locating means for a spring is required is if an assembly of two or more leaf springs is used. The individual springs will typically require to be held in fixed positions relative to one another at one point along their lengths. It is the object of the present invention to provide an improved means whereby such location can be achieved.

2. Summary of the Invention

According to one aspect of the invention, I provide an assembly comprising a leaf spring of composite material, clamping means, and a component secured to the spring by said clamping means, characterised by a locating element having a head portion extending into a depression in said spring, said head portion and depression having shallow sloping walls, and a body portion co-operating with said component, to determine the position of said component relative to the spring.

The provision in the spring of a shallow, sloping walled, depression has a minimum effect on the properties of the spring. Further, since composite springs are typically manufactured by a moulding process, in which resin impregnated fibres are subjected to heat and pressure in a mould to cure the resin and form the finished spring, such a depression can easily be provided in the spring in manufacture. Drilling or other operations on the spring are not required subsequent to the moulding process. When the component is clamped to the spring, the locating element provides adequate security against relative movement, despite its engaging in only a shallow depression in the spring.

The head portion of the locating element, and the depression in the spring, may be of part-spherical shape. Alternatively, the head portion of the locating element could have a flat top, and the depression in the spring have a flat bottom.

When a component is secured by clamping means to a composite leaf spring, it is usual to arrange for relatively large areas of clamped surfaces of the component and spring, and a load distributing element of rubber or plastics material may be interposed between these surfaces. One problem that occurs in service with such an arrangement is that dirt can penetrate between the clamped surfaces and lead to wear from abrasion as the spring flexes. Thus, selection of a material for the load distributing element must be carried out very carefully if it is to perform satisfactorily. The material must be soft enough to spread the load into the composite material of the spring, as loads can be very high if elements such as U-bolts are used as the clamping means, and if such loads are not satisfactorily spread fatigue cracks can propogate into the spring. Conversely, if the material is too soft, the element becomes compressed and again will not perform any load spreading function. The abrasion resistance of the material must be good because of the abrasion effect referred to above.

In an assembly comprising an element of a resilient material interposed between the spring and component, the invention provides that the body portion of the locating element may extend through an aperture in the resilient element. If the resilient element is secured to the spring by an adhesive, which is desirable because it prevents dirt entering between the surface of the spring and the resilient element, the resilient element will serve to retain the locating element in engagement with the spring. This facilitates assembly of the spring and component.

The resilient element preferably comprises a polyurethane rubber material having a Shore D hardness in the range 50-60, and good resistance to abrasion.

To resist possible penetration of dirt, to abrade the composite material of the spring, the resilient element preferably extends, longitudinally of the spring, beyond the spring-engaging end of the component secured thereto.

The use of a locating element according to the invention is possible whether the component secured to the spring is an axle or associated part, or another composite spring. In the latter case, a further locating element of similar form to the first element may be used, engaging a depression in the further spring, with the body portions of the two locating elements co-operating with one another, either directly or by way of a spacer member between the springs.

BRIEF DESCRIPTION OF DRAWINGS

The invention further provides a method of manufacturing a leaf spring of composite material, in which an assembly of fibres impregnated with resin is pressed in a mould to cure the resin and form the finished spring, wherein the mould has at least one formation extending into the spring to form a shallow, sloping walled, depression therein, adapted to receive a locating element.

In the manufacture of a spring by such a method, the formation of a depression with relatively shallow sloping walls in the spring ensures a minimum disruption of the fibres in the surface of the spring, and a minimum tendency to form a region in which there is a high resin content but relatively few fibres. The properties of the finished spring are thus not disadvantageously affected.

The formation in the mould may be provided by the locating element itself, which remains attached to the spring when the spring is removed from the mould. The resin, in effect, adhesively connects the locating element to the spring. To assist such connection, the locating element may have keying formations which are penetrated by resin and entered by fibres during the mould process. Such provision in the locating element is not, however, necessary if a resilient element secured to the spring holds the locating element in place.

Figure 1:
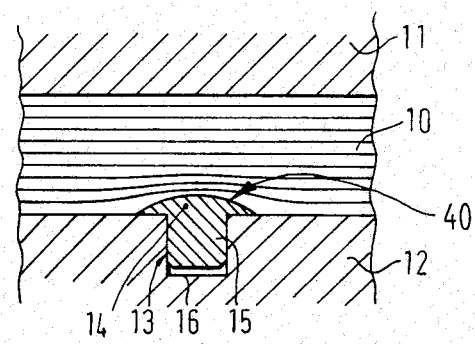
Figure 2:
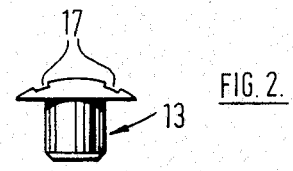
Figure 3:
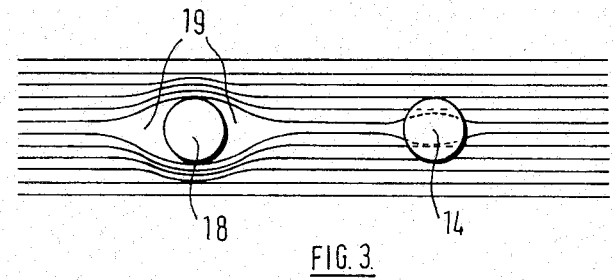
Figure 4:
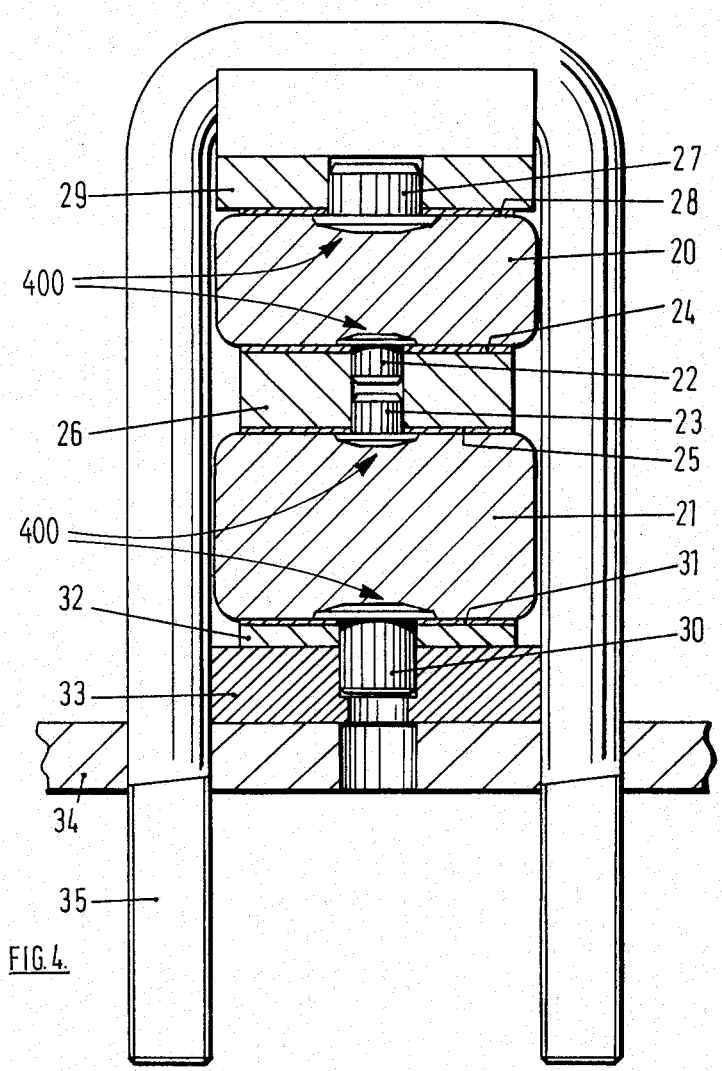
Figure 5:
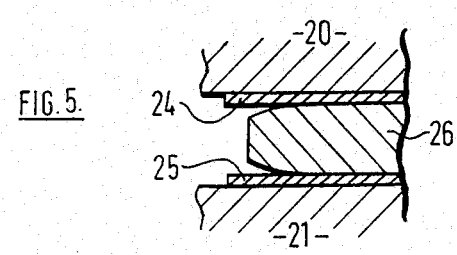

The invention will now be described by way of example with reference to the accompanying drawings, of which:

FIG. 1 is a diagrammatic section showing the manufacture of a spring by moulding, and a locating element;

FIG. 2 is an elevational view of the locating element shown in FIG. 1;

FIG. 3 shows diagrammatically the effect achieved, and problem overcome, by the invention;

FIG. 4 is a transverse cross-section through an assembly according to the invention;

FIG. 5 is a longitudinal section through part of the assembly of FIG. 4.

DESCRIPTION OF PREFERRED EMBODIMENTS

Referring firstly to FIG. 1 of the drawings, there is shown diagrammatically the manufacture of a composite, fibre reinforced resin, spring 10. The spring comprises fibres the majority of which extend longitudinally of the spring, set in a resin such as an epoxy resin. The fibres may be glass fibres. The spring is manufactured by assemblying a succession of layers of fibres impregnated with resin until the required thickness of spring is built up, and introducing such assembly into a closed press tool between relatively movable upper and lower elements 11, 12. The assembly is subjected to heat and pressure to cure the resin and mould the finished spring.

In FIG. 1 there is shown a locating element 13 on the lower element 12 of the press tool. The locating element has a head portion 14, which is relatively shallow and is of part-spherical form, and a body portion 15 which is of cylindrical form with an end chamfer and which extends into an aperture 16 in the element 12. The head portion 14 of the locating element forms a shallow, sloping walled, depression 40 in the spring during the curing of the resin thereof. The locating element may remain secured to the spring by adhesion to the resin thereof when the spring is removed from the moulding press, to provide for location of another component relative to the spring as described hereafter. Alternatively the element 15 may remain in the press element 12, to leave a depression, or shape corresponding to its head portion, in the spring.

Referring now to FIG. 2, this shows one form of the locating element 13 in more detail. Its head portion may be provided with recesses 17 into which, during the moulding operation to form the spring, resin and fibres enter to provide a more positive securement of the locating element to the spring. The recesses 17 comprise grooves extending parallel to one another across the head of the locating element, and the locating element preferably would be placed in the press tool element 12 such that the grooves extend longitudinally of the spring, i.e. in the same direction as the majority of the fibres in the spring adjacent thereto.

Because the depression formed in the spring is shallow and has gently sloping walls, the orientation and disposition of the fibres in the surface region of the spring adjacent the recess is not unduly disturbed. FIG. 3 illustrates what can occur if a deep or unduly steep sided depression 18 is formed in the spring, which is that the fibres become displaced laterally and leave areas 19 on either side of the depression which comprise mostly resin with very few fibres. This could disadvantageously affect the properties of the spring. According to the invention, however, because of the configuration of the depression the fibres remain largely undisturbed by the formation thereof and the properties of the spring are not disadvantageously affected.

Referring now to FIG. 4 of the drawings, this shows an assembly according to the invention. It comprises two composite springs 20, 21 which are parallel to one another and separated by a spacer element 26. Above spring 20 there is disposed a clamping plate 29, and below spring 21 a clamping plate 32 and an element 33 connected to a part 34 of an axle beam. A U-bolt 35 embraces the assembly, and has the free end of its limbs threaded to receive nuts, not shown, by which the assembly is clamped tightly to hold the elements of the assembly together.

The position of springs 20, 21 is determined relative to one another by locating elements 22, 23, with head portions engaging depressions 400 in the respective springs and body portions which engage opposite ends of an aperture extending through the spacer element 26. The position of clamping plate 29 relative to spring 20 is determined by a locating element 27 whose head engages a depression 400 in the opposite surface of spring 20 to that engaged by the locating element 22, and a body portion engaging an aperture in clamping plate 29. A locating element 30 engages a depression in the opposite side of spring 21 to that engaged by locating element 23, and has a body portion extending through an aperture in clamping plate 32 and engaging component 33 so that the position of the axle beam 34 is determined relative to the spring 21.

In the assembly illustrated in FIG. 4, a relatively thin element of a resilient material is provided on each clamped surface of the springs 20, 21. Such elements are shown at 24, 25, 28, 31. These elements are of a sheet polyurethane rubber material, having a shore D hardness in the range 50–60 and good resistance to abrasion. They are secured to the surfaces of the springs by adhesive, and retain the locating elements 22, 23, 27, 30 in position in the depressions in the springs, if the locating elements are not themselves adhesively secured as described above. The purpose of the elements of resilient material is to spread the clamping load into the spring material, and to prevent dirt penetrating to the spring clamped surfaces to cause abrasive wear.

Part of the assembly of FIG. 4 is shown in lateral view in FIG. 5. It will be noted that the elements 24, 25 of resilient material extend, longitudinally of the spring, beyond the end of the spacer element 26, which end is of tapered configuration. Abrasive dirt is thus prevented from penetrating to the clamped surfaces of the springs. The securement of the elements 24, 25 to the springs by adhesive ensures that the ends thereof beyond element 26 do not lift from the springs which would permit dirt to enter.

One example of a suitable material for the resilient elements is a polyurethane rubber known as Dunlop 'Prescollan', grade 27 A 13, hardness 55 Shore D. By way of example, the elements of such material may be about 1.5 mm thick.

It will be noted that in the assembly shown in FIG. 4, the head portions of the locating elements are not of part-spherical configuration. They comprise successive frusto-conical portions. However, such head portions are still relatively shallow compared with the thickness of the springs, and have side walls which slope such that they do not disadvantageously affect the disposition of fibres within the springs.

It would be possible for the body portions of the locating elements to be of different configuration to the cylindrical form illustrated, as required to engage with specific components to be secured to springs. It would be possible for the body portions of locating elements 22, 23 to interfit with one another, e.g. by a spigot and socket, as an alternative or in addition to engaging in opposite ends of the aperture in the spacer element 26.

I claim:

1. An assembly comprising:
    a leaf spring of composite material comprising fibres embedded in a resin,
    a clamping means engaging said spring and also engaging a first member to secure said member to the spring,
    a locating element having a head portion and a body portion, said head portion extending into a depression defined in a surface of said spring and said body portion engaging said member to determine the position of said member relative to said spring, said depression being shallow relative to the thickness of the spring, having sloping walls and having been formed in the spring during manufacture thereof in a moulding process whereby fibres adjacent said depression remain substantially undisplaced by the formation of said depression.

2. An assembly according to claim 1 wherein said head portion and depression are of part-spherical form.

3. An assembly according to claim 1 wherein said locating element is secured to the spring by an adhesive connection between said head portion and the surface of said depression in the spring.

4. An assembly according to claim 1 further comprising an element of a resilient material interposed between said spring and said member, said body portion of said locating element extending through an aperture in said resilient element.

5. An assembly according to claim 4 wherein said resilient element is secured to the spring by an adhesive.

6. An assembly according to claim 4 wherein said resilient element comprises a polyurethane rubber material having a Shore D hardness in the range 50–60, and good resistance to abrasion.

7. An assembly according to claim 4 wherein said resilient element extends, longitudinally of the spring, beyond the spring-engaging end of said member.

8. An assembly according to claim 1 including a further leaf spring of a composite material, and there being a further locating element having a head portion, extending into a shallow, sloping walled, depression in said further spring, and a body portion, the body portions of said locating elements co-operating to determine the positions of said springs relative to one another.

9. An assembly according to claim 8 further comprising a spacer member between said springs, and wherein said body portions of said locating elements engage formations in said spacer member.

10. An assembly according to claim 1 including a further leaf spring of a composite material, and there being a further locating element having a head portion, extending into a shallow, sloping walled, depression in said further spring, and a body portion, the body portion of said further locating element engaging with means to determine the positions of said springs relative to one another.

11. An assembly according to claim 1 in which the first member comprises a component attached to an axle.

12. An assembly according to claim 1 including a second leaf spring of said composite material;
    a spacer member between the two leaf springs;
    locating elements having a head portion and a body portion;
    at least one locating element head portion extending into a shallow sloping walled depression in the first leaf spring and a body portion engaging a formation in said spacer member;
    at least one locating element head portion extending into a shallow walled depression in the second leaf spring and a body portion engaging a formation in said spacer member to thereby determine the positions of said springs relative to one another; and
    with fibres adjacent all the depressions being substantially undisplaced by the depressions.

13. An assembly according to claim 12 in which the first member and spacer member are on opposite sides of the first spring.

* * * * *